(12) United States Patent
Koster et al.

(10) Patent No.: US 6,331,876 B1
(45) Date of Patent: *Dec. 18, 2001

(54) METHOD OF UPDATING SOFTWARE IN A VIDEO RECEIVER

(75) Inventors: John Koster; Frank Bosveld, both of Eindhoven (NL)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/962,152

(22) Filed: Nov. 3, 1997

(30) Foreign Application Priority Data

Nov. 12, 1996 (FR) .................................... 96 13757

(51) Int. Cl.[7] .............................. H04N 7/00; H04N 7/10; H04H 1/02; H04H 1/00
(52) U.S. Cl. ........................... 348/725; 348/725; 348/10; 348/6; 348/7; 455/6.2; 455/6.3; 455/5.1; 455/4.2
(58) Field of Search .............................. 348/10, 6, 7, 12, 348/13, 725; 455/6.2, 6.3, 5.1, 4.2; 380/20

(56) References Cited

U.S. PATENT DOCUMENTS

| | | | |
|---|---|---|---|
| 5,003,591 | * 3/1991 | Kauffman et al. | 380/10 |
| 5,440,632 | * 8/1995 | Bacon et al. | 348/12 |
| 5,619,250 | * 4/1997 | McClellan et al. | 348/10 |
| 5,635,979 | * 6/1997 | Kostreski et al. | 348/13 |
| 5,654,747 | * 8/1997 | Ottesen et al. | 348/12 |
| 5,666,293 | * 9/1997 | Metz et al. | 395/200.5 |
| 5,768,539 | * 6/1998 | Metz et al. | 348/10 |
| 5,822,324 | * 10/1998 | Kostersti et al. | 370/487 |
| 5,847,771 | * 12/1998 | Cloutier et al. | 348/564 |
| 5,973,684 | * 10/1999 | Brooks et al. | 345/327 |

* cited by examiner

Primary Examiner—Reinhard J. Eisenzopf
Assistant Examiner—Paulos M. Natnael
(74) Attorney, Agent, or Firm—Edward W. Goodman

(57) ABSTRACT

When new software is received by air in the form of successive blocks by a video receiver having a specialized digital video processing module (19), connected by a first bus (28) to a specialized video memory (29), and a microprocessor (15) connected by a second bus (27) to a rewritable program memory (26), the microprocessor verifies the blocks of this new software one by one and stores them in the video memory (29) of the specialized video processing module until the new software is complete. Not until that moment will the new software be transferred to the program memory (26).

10 Claims, 1 Drawing Sheet

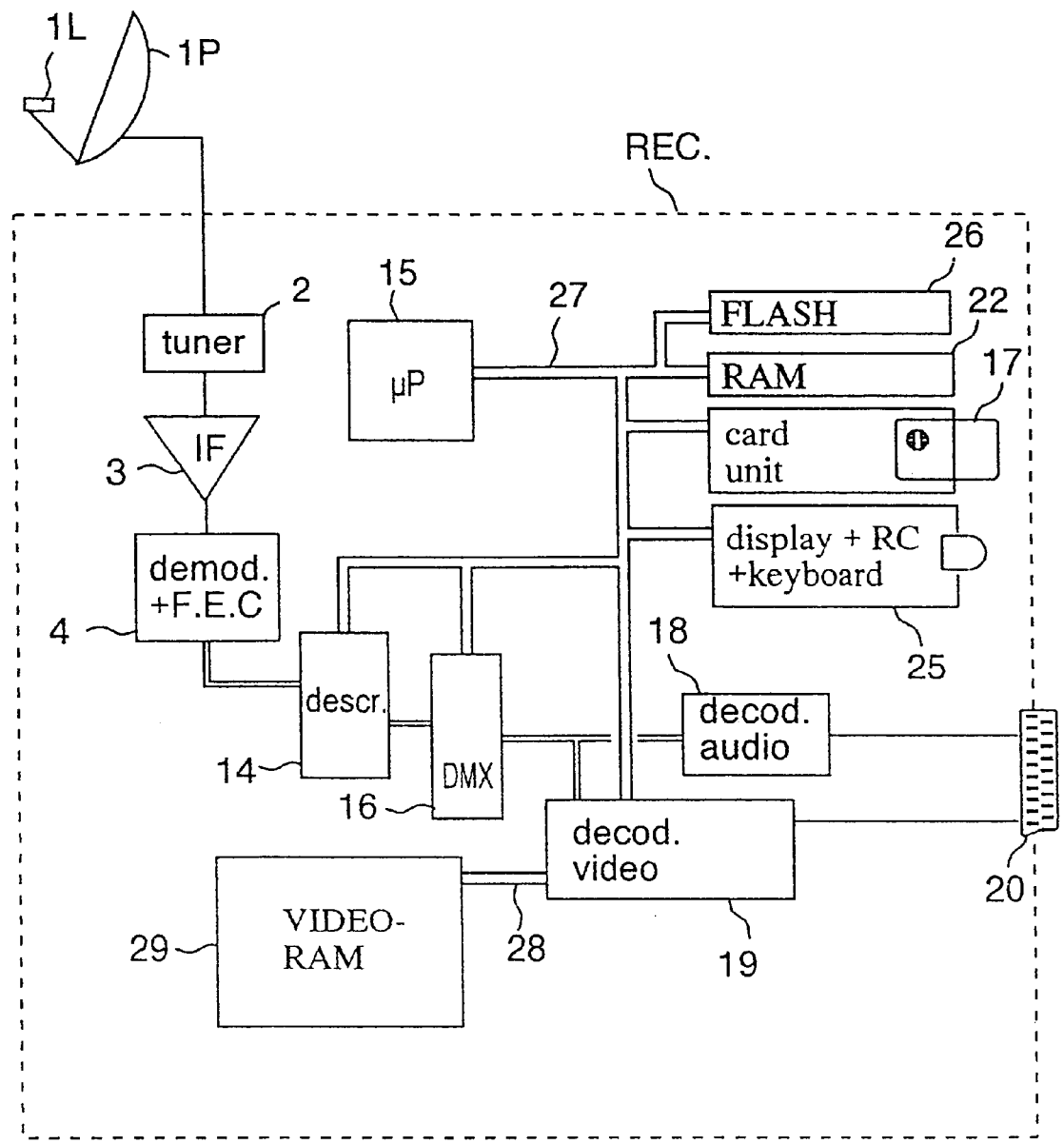

METHOD OF UPDATING SOFTWARE IN A VIDEO RECEIVER

BACKGROUND OF THE INVENTION

1. Field of the Invention

The present invention relates to a method of updating software, in a video receiver that comprises receiver means for receiving video signals and digital data sent by a television transmitter, said receiver means comprising, for example, a specialized digital video processing module connected by a first bus to a specialized video memory, and a microprocessor connected by a second bus to a rewritable program memory in which are written the basic instructions by which it can operate.

2. Description of the Related Art

The invention also relates to such a video receiver.

Updating the software may be decided by a television program provider when an error has been detected in the software of the receivers, or also for adding new functions. This updating consists of replacing old software by new software. Whereas the larger part of the instructions of the new software are identical to those of the old software, it would nevertheless be surprising that each of the instructions of the new software has the same address as the corresponding instruction in the old software. Thus, the software of a receiver, when only partly transformed, becomes totally unusable. A problem is then posed in that the software updating may be interrupted for different reasons during the process.

SUMMARY OF THE INVENTION

It is an object of the invention to solve this problem.

For this purpose, when new software is received in successive parts, the parts of the received software are verified, one by one by, the microprocessor and stored in a random access memory until the software level is complete and, not until that moment will the new software be transferred to the rewritable program memory and will the video memory of the specialized video processing module be used for provisionally storing the received parts of the software.

A receiver according to the invention comprises updating means for replacing the basic instructions taken as a whole by new software which is sent in successive parts, means for verifying the received software parts one by one and for storing them in a random access memory until the new software is complete, and means for transferring the whole new software when it has been received to the rewritable program memory, while said random access memory is formed by the video memory of the specialized video processing module.

Advantageously, the transport of the data from the first bus to the second bus, or vice versa, is realized via the specialized digital video processing module which includes means intended for this purpose.

Preferably, the process of acquiring new software is started during a standby period of the receiver and starting the receiver is forbidden during the transfer of new software to the program memory, the microprocessor including means to that effect.

Advantageously, a message is displayed by the receiver while new software is being transferred to the program memory, the receiver including means to that effect.

These aspects of the invention and also other, more detailed, aspects will provide a better understanding by the following description of an embodiment forming a non-limiting example.

BRIEF DESCRIPTION OF THE DRAWING

The sole FIGURE diagrammatically shows a video receiver incorporating the subject invention.

DESCRIPTION OF THE PREFERRED EMBODIMENTS

The receiver decoder REC shown in FIG. 1 is intended to grant access to coded television programs according to the MPEG-2 standard. It will be clear that the invention also applies to other types of video receivers.

The receiver is connected to a parabolic antenna 1P having a frequency translation module 1L, and comprises a satellite receiver assembly formed by a tuner 2, followed by an intermediate frequency amplifier 3. Then, the intermediate frequency signal is demodulated and certain errors are corrected in a module 4, after which the signal is descrambled, as appropriate, in a descrambling module 14 connected to a chip card reader 17. The chip card 17 provides, in known fashion, the information necessary for descrambling television transmissions, such as a distribution key, the reference of a provider, the characteristics of a subscription to a range of programs broadcast by a provider, the type of descrambling.

The outgoing signal of the descrambling module 14 undergoes the action of a demultiplexer 16 which separates the various programs. The outgoing signal of this demultiplexer requires to be transformed into an analog signal for displaying an image on a screen and applying the sound to a loudspeaker. This transformation is effected in a video decoder 19 and in a sound decoder 18. These decoders are connected to a connector 20 for a connection to a conventional television set. By way of a variant, the elements of the FIGURE could also be internal elements of a television set.

The video signals processed in the decoder 19 are digital at the input and may be stored in a large-capacity video memory 29 while they are being processed, this video memory being capable of, for example, storing a plurality of images. This memory is connected to the decoder 19 by a dedicated bus 28.

A bus 27, which is physically different from bus 28, connects a microprocessor 15 to:

a program memory 26 in which are written the basic instructions by which the microprocessor can function, a random access memory 22 for provisionally storing data, an assembly 25 formed by a control keyboard and/or a remote-control receiver associated to a data display screen, and also to the chip card reader 17.

The instructions in the program memory 26, called flash memory, are not lost when the receiver is turned off, but are capable of being updated. To do this, new software is sent "by air", that is to say, by the television transmit channel while the sending of various digital data is provided in the transmission standard. In certain systems, there is provided that data can be transmitted via a telephone line; this is certainly not as satisfactory as transmission by air, but the invention can also apply to that. The time necessary for the complete reception of software by air is of the order of one minute, and may be longer if the receiving conditions are unfavorable. To improve the tolerance to any transmission errors and to facilitate the reception by receivers having different capacities, the software is sent in successive parts of blocks alternating with images. In the receiver, this process can only be started in the case where this receiver does not have to decode images, typically when it is in the standby mode, so that the microprocessor is free. Complete software may be up to one megabyte large: the program memory 26 has a capacity of one megabyte. The software is transmitted, for example, in blocks of four kilobytes each.

The updating of the software may be interrupted for various reasons, for example: because the user has put the receiver in the receive mode, or because the power has been cut off. In order to avoid the risk of the processor working with partly transformed software, the new software is stored in a memory other than the memory 26 until it is complete and, only at that moment will it be transferred to memory 26 at one time. Here, the memory 29 is used for that purpose. As the bus 28 is physically different from bus 27, the transport of the data from one bus to another is realized via the decoder 19.

The operation is the following: when the transmitter starts transmitting new software, this fact is indicated by a specific digital data. The number of the version of the software in question is also supplied. The data are acquired by the decoder 19 and transmitted to the microprocessor. When said particular digital data is recognized, the program pointer of the microprocessor is positioned at the old software address of the instructions for handling the receiving process of new software. The microprocessor first verifies whether the software version in question is not the one already in possession of the receiver. Each packet of a software block transmitted to the microprocessor has a signature-type of coding, for example, a Cyclic Redundancy Check (CRC), which permits the microprocessor of analyzing the code and verifying its coherence. If the block turns out to be correct, it is sent to the decoder 19 which writes the block in the memory 29 via the bus 28. If a block is not correct, the system waits for the next occurrence at which the same block is transmitted. When all the blocks have been received correctly and stored, the microprocessor starts the transfer process to the program memory 26, which transfer takes place by the bus 28, the decoder 19 and the bus 27, under control of the microprocessor 15.

If the user starts the receiver while data are being received, the process is interrupted. It will be resumed later, when the receiver is again in the standby mode. Nevertheless, during the time of the final transfer to the program memory, no interruption is allowed. For this purpose, a function then inhibits the remote control receiver of the assembly 25 to block the start of the receiver and, in order for the user to understood why his receiver refuses to start, a message appears on the screen: for example "CURRENTLY WORKING".

We claim:

1. A method of updating software in a video receiver having receiver means for receiving video signals and digital data sent by a television transmitter, said receiver means comprising a digital video processing module for processing the received video signal, a video memory connected by a first bus to the digital video processing module for selectively storing the video signal, an output coupled to the digital video processing module and for selectively supplying the video signal and the stored video signal, and a microprocessor connected by a second bus to a rewritable program memory having basic instructions for operating the video receiver written therein, wherein said method comprises the steps:

receiving video signals;

processing said received video signal in said digital video processing module;

selectively storing said video signal in said video memory; and selectively supplying said video signal and said stored video signal to output, characterized in that said method further comprises the steps:

receiving new software for entirely replacing the basic instructions written in said rewritable program memory, said new software being received in successive parts;

verifying, one by one, the successive parts of the received new software using the microprocessor;

provisionally storing each of the verified successive parts of the received new software in the video memory of the digital video processing module until all of the successive parts of the new software are received, verified and stored in the video memory, indicating that the new software, in toto, is stored in the video memory; and transferring the new software, in toto, from the video memory to the rewritable program memory, whereby the basic instructions in the rewritable program memory are not corrupted in the event that the reception of the successive parts of the new software is interrupted prior to receipt of the new software, in toto.

2. The method as claimed in claim 1, characterized in that in said step of transferring the new software, in toto, from the video memory to the rewritable program memory, the data representing the new software is transferred from the first bus to the second bus, or vice versa, through the digital video processing module.

3. A method of updating software in a video receiver having receiver means for receiving video signals and digital data sent by a television transmitter, said receiver means comprising a digital video processing module for processing the received video signal, a video memory connected by a first bus to the digital video processing module for selectively storing the video signal, an output coupled to the digital video processing module for supplying the video signal or the stored video signal, and a microprocessor connected by a second bus to a rewritable program memory in which are written basic instructions for operating the video receiver, wherein said method comprises the steps:

receiving video signals;

processing said received video signal in said digital video processing module; and selectively storing said video signal in said video memory, and selectively supplying said stored video signal to said digital video processing module, characterized in that, when new software is received in successive parts, said method further comprises the steps:

verifying, one by one, the successive parts of the received software using the microprocessor;

storing the verified successive parts of the received software in the video memory until the all of the successive parts of the software are received, verified and stored in the video memory indicating that a complete software is stored in the random access memory; and transferring the complete software in the video memory to the rewritable program memory, characterized in that the process of acquiring new software is started during a standby period of the video receiver.

4. The method as claimed in claim 3, characterized in that said method further comprises the step:
　inhibiting user operation of the receiver during the transfer of new software to the rewritable program memory.

5. The method as claimed in claim 4, characterized in that the method further comprises the step:
　displaying an advisory message while new software is being transferred to the rewritable program memory.

6. A video receiver for receiving and decoding video signals and digital data sent by a television transmitter, the video receiver comprising:
　a digital video processing module for processing the received video signal;
　a video memory connected by a first bus to the digital video processing module for selectively storing the video signal and for selectively supplying the stored video signal to the digital video processing module; and
　a microprocessor connected by a second bus to a rewritable program memory having basic instructions for operating the video receiver written therein, characterized in that said video receiver further comprises:
　updating means for receiving new software for entirely replacing the basic instructions written in the rewritable program memory, said new software being received in successive parts;
　means for verifying, one by one, the received successive parts, and for provisionally storing each of the received successive parts in the video memory of the digital video processing module until all of the successive parts of the new software are received, verified and stored in the video memory, indicating that the new software, in toto, is stored in the video memory; and
　means for transferring the new software, in toto, from the video memory to the rewritable program memory, whereby the basic instructions in the rewritable program memory are not corrupted in the event that the reception of the successive parts of the new software is interrupted prior to receipt of the new software, in toto.

7. The video receiver as claimed in claim 6, characterized in that the digital video processing module comprises means for transporting data from the first bus to the second bus or vice versa.

8. A video receiver for receiving and decoding video signals and digital data sent by a television transmitter, the video receiver comprising:
　a digital video processing module for processing the received video signal;
　a video memory connected by a first bus to the digital video processing module for selectively storing the video signal;
　an output coupled to the digital video processing module for supplying the video signal or the stored video signal; and
　a microprocessor connected by a second bus to a rewritable program memory in which are written basic instructions for operating the video receiver, characterized in that said video receiver further comprises:
　updating means for replacing the basic instructions as a whole by new software which is sent in successive parts;
　means for verifying the successive parts received one by one and for storing the successive parts in said video memory until the new software is complete; and
　means for transferring the new software, when complete, from the video memory to the rewritable program memory, characterized in that the microprocessor comprises:
　means for starting the acquisition process for new software during a standby period of the video receiver.

9. The video receiver as claimed in claim 8, characterized in that the microprocessor comprises:
　means for inhibiting user operation of the video receiver while new software is being transferred to the rewritable program memory.

10. The video receiver as claimed in claim 9, characterized in that said video receiver further comprises:
　means for displaying an advisory message while new software is being transferred to the rewritable program memory.

\* \* \* \* \*